United States Patent [19]
Jon et al.

[11] Patent Number: 5,225,474
[45] Date of Patent: Jul. 6, 1993

[54] EMULSION POLYMERIZATION COMPOSITION

[75] Inventors: Domingo I. Jon, New York, N.Y.; John C. Hornby, Washington Township, Westwood County, N.J.

[73] Assignee: ISP Investments Inc., Wilmington, Del.

[21] Appl. No.: 928,594

[22] Filed: Aug. 18, 1992

[51] Int. Cl.⁵ .............................. C08F 2/16
[52] U.S. Cl. ............................ 524/460; 524/458
[58] Field of Search ......................... 524/460, 458

[56] References Cited
U.S. PATENT DOCUMENTS

| | | | |
|---|---|---|---|
| 4,226,752 | 10/1980 | Erickson et al. | 524/460 |
| 4,380,600 | 4/1983 | Hosoda et al. | 524/960 X |
| 4,861,818 | 8/1989 | Timmerman et al. | 524/460 |

Primary Examiner—Joseph L. Schofer
Assistant Examiner—Jeffrey T. Smith
Attorney, Agent, or Firm—Walter Katz; Marilyn J. Maue; Joshua J. Ward

[57] ABSTRACT

An emulsion polymerization composition comprising: (a) 1-45% by weight of an emulsion polymerizable monomer, (b) 0.1-5% by weight of a emulsifier and stabilizer which is a copolymer of a vinyl lactam and a polymerizable carboxylic acid, in a 99/1 to 1/99 weight ratio, (c) 0.1-2% by weight of a polymerization initiator, and (d) the rest being water, in the form of an aqueous dispersion, provides latexes having small particle sizes, in high yield, with little or no residual monomer, upon polymerization at 80°-82° C. for at least 0.5 hour.

4 Claims, No Drawings

EMULSION POLYMERIZATION COMPOSITION

BACKGROUND OF THE INVENTION

1. Field of the Invention

This invention relates to emulsion polymerization, and, more particularly, to an emulsion polymerization composition which includes a copolymer of a vinyl lactam and a polymerizable carboxylic acid as emulsifier and stabilizer in the composition.

2. Description of the Prior Art

Emulsion polymerization to form polymer latexes usually employ surfactants as the emulsifying agent in the polymerization composition and process. However, it is desired in the art to provide new and improved emulsifiers in such process, and particularly, defined emulsifiers which can function to stabilize the emulsion polymer product in the form of a latex having a small particle size, in high yield, and with little or no residual monomer.

SUMMARY OF THE INVENTION

The emulsion polymerization composition of the invention comprises:
(a) about 1-45% by weight of an emulsion polymerizable monomer,
(b) about 0.1-5% by weight of a emulsifier and stabilizer which is a copolymer of (i) a vinyl lactam and (ii) a polymerizable carboxylic acid, in a 99/1 to 1/99 weight ratio,
(c) about 0.1-2% by weight of a polymerization initiator, and
(d) the rest being water, in the form of an aqueous dispersion.

DETAILED DESCRIPTION OF THE INVENTION

The emulsifier and stabilizer copolymer used in the emulsion polymerization composition of the invention comprises a vinyl lactam and a polymerizable carboxylic acid. This copolymer may be made by precipitation polymerization of the monomers in an aliphatic hydrocarbon solvent in the presence of a polymerization initiator.

Suitable vinyl lactams for use herein include vinyl pyrrolidone, vinyl caprolactam and alkylated vinyl derivatives thereof. Suitable polymerizable carboxylic acids include e.g. acrylic acid, methacrylic acid, itaconic acid, maleic acid, and crotonic acid. Acrylic acid itself, or methacrylic acid, is a preferred coreactant monomer in the polymerization. These monomers may be employed in weight ratios over the entire compositional range of the copolymers, i.e. from 1-99 weight percent vinyl lactam and 99:1 weight percent of acrylic acid. Accordingly, weight ratios of VP:AA in the copolymer of 99:1, 75:25, 50:50, 25:75 and 1:99, for example, may be conveniently prepared for use in this invention in substantially quantitative yields.

The reaction solvent of the invention suitably is a $C_3$-$C_{10}$ saturated hydrocarbon which is branched or unbranched, cyclic or acyclic. Preferably the solvent is a $C_5$-$C_8$ aliphatic hydrocarbon or mixtures thereof.

Preferred aliphatic hydrocarbon solvents are heptane and cyclohexane. Heptane, the most preferred solvent, provides high yields of a precipitate of the desired copolymer as a fine white powder which is easy to filter and dry.

The amount of solvent used to prepare such copolymers should be sufficient to dissolve an appreciable amount of the reactants and to maintain the copolymer precipitate in a stirrable state at the end of the polymerization. Generally, up to about 40% solids, preferably 15-20% solids, is maintained in the reaction mixture.

The precipitation polymerization process is carried out in the presence of a polymerization initiator, preferably a free radical initiator, and most suitably, a peroxy ester, e.g. t-butylperoxy pivalate, although other free radical initiators such as acylperoxides, alkyl peroxides and may be used as well. The amount of such initiator may vary widely; generally about 0.2-5.0% is used, based on the weight of total monomers charged.

The reaction temperature of the precipitation polymerization may vary widely; generally the reactants are maintained at about 50°-150° C., preferably 60°-70° C., during the polymerization. Pressure usually is kept at atmospheric pressure, although higher and lower pressures may be used as well.

The reaction mixture also should be stirred vigorously under an inert atmosphere, e.g. nitrogen, during the polymerization. A stirring rate of about 400-600 rpm in a 1-liter lab reactor is quite adequate to effect the desired polymerization and to keep the precipitate in a stirrable state during the polymerization.

The monomers and initiator used in such process are commercially available materials, as described below.

|  | Source | Form |
|---|---|---|
| Monomers |  |  |
| Vinyl pyrrolidone | ISP | Liquid |
| or |  |  |
| Vinyl caprolactam | Aldrich | Solid |
| Acrylic acid | Rohm and Haas | Liquid |
| or |  |  |
| Methacrylic acid | Aldrich | Liquid |
| Initiator |  |  |
| t-Butylperoxy pivalate | Pennwalt Corp. (Lupersol 11) | Liquid; 75% solution in mineral spirits |

The precipitation polymerization process may be carried out by first precharging a suitable reactor with a predetermined amount of a vinyl lactam in the aliphatic hydrocarbon solvent, and heating the solution to a desired reaction temperature while stirring vigorously under an inert gas atmosphere. The initiator is then charged into the reactor. Then a selected amount of the polymerizable carboxylic acid, e.g. acrylic acid, is admitted into the reactor over a period of time, generally about an hour or more. Then the reaction mixture is held for an additional period of time for polymerization to occur. Finally, the mixture is cooled to room temperature. Filtering, washing with solvent, and drying provides the copolymer in yields approaching quantitative, and, substantially, in a composition predetermined by the weight ratio of monomers introduced into the reactor.

Alternatively, the aliphatic hydrocarbon solvent can be precharged into the reactor, purged with nitrogen, heated to reaction temperature, the initiator added, and then separate streams of the vinyl lactam monomer and the acrylic acid monomer are introduced over a period of time into the precharged reactor.

A typical run for preparing copolymers of vinyl pyrrolidone and acrylic acid (know as "Acrylidones") is described below A 1-liter, 4-necked reaction kettle was equipped with a mechanical stirrer, thermometer, dropping funnel and a nitrogen purge tube. The reactor was precharged with 75 g. of vinyl pyrrolidone in 500 g. of heptane. The solution then was heated to 65° C. during 20 minutes and held there for 30 min., while stirring under nitrogen gas. Then 260 microliter (0.3 g.) of t-butylperoxy pivalate initiator was added. Then 25 g. of acrylic acid was admitted during a period of 1 hour and the mixture was held for an hour. Then an additional 140 microliter (0.2 g.) of initiator was admitted into the reaction mixture and the solution was maintained at 65° C. with stirring for another 2 hours. Then another 100 microliter of initiator was added and the mixture held for 2 hours.

The reaction product then was cooled to room temperature during a period of about an hour. A fine white powder precipitate of copolymer product was obtained which was filtered, washed twice with heptane and dried overnight at 100° C. and then overnight again in a vacuum oven at 100° C. A 75:25 VP:AA copolymer (wt. ratio) was obtained in 97% yield. The product had a K-value of about 70 (1% copolymer in 0.1N NaOH and 0.2N $LiNO_3$ aqueous solution); the weight average molecular weight of the copolymer was about 20–80,000, as measured by light scattering in dimethylformamide solvent.

The procedure was followed using 99, 95, 50, 25 and 1 g. of vinyl pyrrolidone and 1, 5, 50, 75 and 99 g. of acrylic acid, to produce the corresponding 99:1, 95:5, 50:50, 25:75 and 1:99 wt. ratio VP:AA copolymers.

Representative emulsion polymerizable vinyl monomers for use in the emulsion polymerization composition of the invention includes:
Styrene
Butadiene
Vinyl acetate
Methyl acrylate
Ethyl acrylate
Butyl acrylate
Vinyl chloride
Acrylonitrile
Acrylamide, and
Ethylene, and mixtures thereof, which may be modified with one or more of the following comonomers:
Acrylic acid
Itaconic acid
Fumaric acid
2-Hydroxyethyl acrylate, and
Methacrylic acid.

The emulsion polymerization process is carried out in the presence of a polymerization initiator or transfer agent. Representative initiators include:
Tertiary dodecyl mercaptan
N-octyl mercaptan
Chloroform
Potassium persulfate.

The emulsion polymerization composition is prepared using water as the dispersion medium to provide an aqueous dispersion of the emulsion polymerizable monomer, or monomers, the emulsifier and stabilizer component, and the polymerization initiator, in predetermined percentage ranges of each.

The invention will now be described with reference to the following examples.

EXAMPLE 1

An emulsion polymerization composition was made from the following components:
(a) 20 g. of ethyl acrylate,
(b) 1.5 g. of 75/25% by weight of a copolymer of vinyl pyrrolidone and acrylic acid,
(c) 0.2 g. of potassium persulfate, and
(d) 78.5 g. of water.

The reaction mixture was prepared by mixing components (a), (b) and (c) and heating to a polymerization temperature of 80°–82° C.; then (c) was added and polymerization was carried out for about 0.5–2.5 hours. At the conclusion of polymerization, a low particle size latex was formed, i.e. about 1.28 microns or less, with little monomer residue. The % solids obtained was 5–10%, (theoretical 10.5%).

EXAMPLES 2–4

The procedure of Example 1 was followed with various ratios of Acrylidones, of different molecular weight, at selected concentrations of reactants. The effect on particle sizes of the latex obtained is shown in the Table below.

TABLE

| Ex. | VP-AA Copolymer* | | | | Monomer | Wt. (g) | Water (g) | Latex Product** Particle Size ($\mu$) |
| | % VP | % AA | MW | Wt. (g) | | | | |
| --- | --- | --- | --- | --- | --- | --- | --- | --- |
| 1 | 75 | 25 | 20,000 | 1.5 | Ethyl Acrylate | 20 | 78.5 | 1.28 |
| 2 | 50 | 50 | 20,000 | 1 | Ethyl Acrylate | 10 | 89 | 0.59 |
| 3 | 25 | 75 | 20,000 | 1 | Ethyl Acrylate | 10 | 89 | 0.39 |
| 4 | 75 | 25 | 80,000 | 1 | Ethyl Acrylate | 10 | 89 | 0.22 |

*Acrylidone
**Particle size at 50% distribution. (Microtrac #9300 - SR & UPA Analyzer from Leedz & Northrop)

The results in the Table show that the particle sizes are 1.28 microns or less; the lowest particle size latex is obtained using a high molecular weight Acrylidone (i.e. 80,000).

While the invention has been described with particulare reference to certain embodiments thereof, it will be understood that changes and modifications may be made which are within the skill of the art. Accordingly, it is intended to be bound only by the following claims, in which:

What is claimed is:
1. An emulsion polymerization composition, in the form of an aqueous dispersion consisting essentially of:
(a) about 1–45% by weight of an emulsion polymerizable monomer which is selected from styrene, butadiene, vinyl acetate, methyl acrylate, ethyl acrylate, butyl acrylate, vinyl chloride, acrylonitrile, acrylamide, and ethylene, and mixtures thereof, and which may include one or more comonomers selected from acrylic acid, itaconic acid, fumaric acid, 2-hydroxyethyl acrylate, and methacrylic acid,
(b) about 0.1–5% by weight of an emulsifier and stabilizer component which is a copolymer of (i) a vinyl lactam and (ii) a polymerizable carboxylic acid, in a 99/1 to 1/99 weight ratio, wherein said copolymer serves to function as an emulsifier and stabilizer component (c) about 0.1-2% by weight of a polymerization initiator, and (d) the rest being water, said weight % being expressed as per composition.

2. An emulsion polymerization composition according to claim 1 in which (b) (i) is vinyl pyrrolidone or vinyl caprolactam; and (b) (ii) is acrylic acid, methacrylic acid, itaconic acid, maleic acid or crotonic acid.

3. An emulsion polymerization composition according to claim 1 wherein:
(a) is ethyl acrylate, and
(b) is a copolymer of vinyl pyrrolidone and acrylic acid.

4. A process which consisting essentially of:
(1) providing the emulsion polymerization composition of claim 1, and
(2) emulsion polymerizing the composition at a temperature of about 80°-82° C. for at least 0.5 hour, to form a latex product which has a particle size of 1.28 microns or less.

* * * * *